United States Patent
Blaner et al.

(10) Patent No.: US 7,971,161 B2
(45) Date of Patent: Jun. 28, 2011

(54) APPARATUS AND METHOD FOR IMPLEMENTING SPECULATIVE CLOCK GATING OF DIGITAL LOGIC CIRCUITS

(75) Inventors: Bartholomew Blaner, Underhill Center, VT (US); Mary D. Brown, Austin, TX (US); William E. Burky, Austin, TX (US); Todd A. Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 12/019,718

(22) Filed: Jan. 25, 2008

(65) Prior Publication Data

US 2009/0193281 A1 Jul. 30, 2009

(51) Int. Cl.
*G06F 17/50* (2006.01)
*G06F 1/04* (2006.01)

(52) U.S. Cl. .................. 716/100; 716/101; 713/500
(58) Field of Classification Search ................. 716/100, 716/101; 713/500
See application file for complete search history.

(56) References Cited

U.S. PATENT DOCUMENTS

| | | | |
|---|---|---|---|
| 6,009,533 A * | 12/1999 | Zick | 713/501 |
| 6,247,134 B1 | 6/2001 | Sproch et al. | |
| 6,393,579 B1 * | 5/2002 | Piazza | 713/600 |
| 6,609,209 B1 | 8/2003 | Tiwari et al. | |
| 6,745,336 B1 * | 6/2004 | Martonosi et al. | 713/340 |
| 6,906,554 B1 | 6/2005 | Chen | |
| 7,359,846 B1 * | 4/2008 | Fernandez | 703/13 |
| 2003/0149905 A1 * | 8/2003 | Santhanam et al. | 713/500 |
| 2004/0143727 A1 * | 7/2004 | McDonald | 712/228 |
| 2006/0136854 A1 * | 6/2006 | Arp et al. | 716/10 |
| 2009/0106616 A1 * | 4/2009 | Ozer et al. | 714/746 |

* cited by examiner

*Primary Examiner* — Stacy A Whitmore
*Assistant Examiner* — Magid Y Dimyan
(74) *Attorney, Agent, or Firm* — Cantor Colburn LLP; Michael LeStrange

(57) ABSTRACT

A method for implementing speculative clock gating of digital logic circuits in a multiple stage pipeline design includes generating, in a first pipeline stage n, a valid control signal that is input to a first register in a second pipeline stage n+1, the valid control signal indicative of when an operation is qualified to be performed by the second pipeline stage n+1; and generating, in the first pipeline stage, a speculative valid control signal that is used to gate a clock signal to a plurality of additional registers in the second pipeline stage, wherein the speculative valid control signal is generated using only a subset of a total number of control inputs used in generating the valid control signal, and wherein the clock signal is sent directly, without gating, to the first register in the second pipeline stage.

24 Claims, 3 Drawing Sheets

APPARATUS AND METHOD FOR IMPLEMENTING SPECULATIVE CLOCK GATING OF DIGITAL LOGIC CIRCUITS

BACKGROUND

The present invention relates generally to digital logic circuit devices and, more particularly, to an apparatus and method for implementing speculative clock gating of digital logic circuits.

Clock gating is a widely adopted technique for deactivating particular resources within an integrated circuit (IC). A clock gating circuit activates/deactivates an IC resource by gating a clock signal provided to the resource. In response to an active clock enable signal, the clock gating circuit passes the clock signal to a target resource. Conversely, the clock gating circuit inhibits or blocks the clock signal from reaching the target resource when the clock enable signal is inactive. Thereby, the states of individual storage devices (e.g., flip-flops) associated with the target resource do not needlessly change state, as would otherwise be the case if the clock signal were always passed through to the resource.

In particular, fine-grained clock gating is an important technique for reducing the power consumption of digital logic circuits in pipelined designs where information developed in earlier stages of the pipeline may be used to create clock gating signals for use in later pipeline stages. However, in some cases, the communication and logic delays incurred in developing a precise clock gating signal (i.e., a signal which never fails to gate any clock pulse that could have been gated) may be so large that the signal actually arrives too late to gate the clock, rendering the gating signal infeasible.

Accordingly, it would be desirable to be able to address the delays associated with traditional precise clock gating, but in a manner that still offers advantages in terms of power savings with respect to circuits that are not clock gated to begin with.

SUMMARY

The foregoing discussed drawbacks and deficiencies of the prior art are overcome or alleviated, in an exemplary embodiment, by a method for implementing speculative clock gating of digital logic circuits included in a multiple stage pipeline design, the method including generating, in a first pipeline stage n, a valid control signal that is input to a first register in a second pipeline stage n+1, the valid control signal indicative of when an operation is qualified to be performed by the second pipeline stage n+1; and generating, in the first pipeline stage, a speculative valid control signal that is used to gate a clock signal to a plurality of additional registers in the second pipeline stage, wherein the speculative valid control signal is generated using only a subset of a total number of control inputs used in generating the valid control signal, and wherein the clock signal is sent directly, without gating, to the first register in the second pipeline stage.

In another embodiment, an apparatus for implementing speculative clock gating of digital logic circuits included in a multiple stage pipeline design includes operation valid logic configured to generate, in a first pipeline stage n, a valid control signal that is input to a first register in a second pipeline stage n+1, the valid control signal indicative of when an operation is qualified to be performed by the second pipeline stage n+1; and speculative valid logic configured to generate, in the first pipeline stage, a speculative valid control signal that is used to gate a clock signal to a plurality of additional registers in the second pipeline stage, wherein the speculative valid control signal is generated using only a subset of a total number of control inputs used in generating the valid control signal, and wherein the clock signal is sent directly, without gating, to the first register in the second pipeline stage.

In still another embodiment, a computer system includes a pipeline having first and second pipeline stages; the first pipeline stage comprising operation valid logic configured to generate a valid control signal for the second pipeline stage, the valid control signal indicative of when an operation is qualified to be performed by the second pipeline stage; the first pipeline stage further comprising speculative valid logic configured to generate a speculative valid control signal that is used to gate a clock signal sent to the second pipeline stage, wherein the speculative valid control signal is generated using only a subset of a total number of control inputs used in generating the valid control signal; the second pipeline stage comprising a first register that receives the valid control signal as a data input thereto, and plurality of additional registers receiving the gated clock signal; and the second pipeline stage further comprising operation decode logic configured to decode operation signals from the first pipeline stage; wherein the clock signal is sent directly, without gating, to the first register in the second pipeline stage.

BRIEF DESCRIPTION OF THE DRAWINGS

Referring to the exemplary drawings wherein like elements are numbered alike in the several Figures.

DETAILED DESCRIPTION

Disclosed herein is an apparatus and method for implementing speculative clock gating of digital logic circuits. Briefly stated, an "imprecise" or speculative clock gating signal is generated that incurs less delay and never gates off a clock that should have been pulsed. However, because of its "speculative" nature, the signal may fail to gate off a clock pulse that need not have occurred. Such a clock gating signal may not save as much power as a conventional precise gating signal, but because the speculative clock gating signal requires less delay to develop, it may allow clock gating in a design where a precise gating signal would have been infeasible. As used herein, the term "speculative" as applied to the gating of a valid clock signal refers to special "speculative valid" logic that uses an incomplete subset of inputs to determine an output validity, wherein the subset of inputs are with respect to a complete set of inputs used by operation valid logic in determining whether the pipelined operation communicated to a subsequent stage is in fact valid. More specifically (and as described in further detail herein), this subset of inputs used by the speculative valid logic includes early conditions that would allow sufficient time for a gated clock to propagate through an entire distribution tree to a multitude of pipeline stage registers, other than an operation latch and an operation valid latch.

Figure 1:
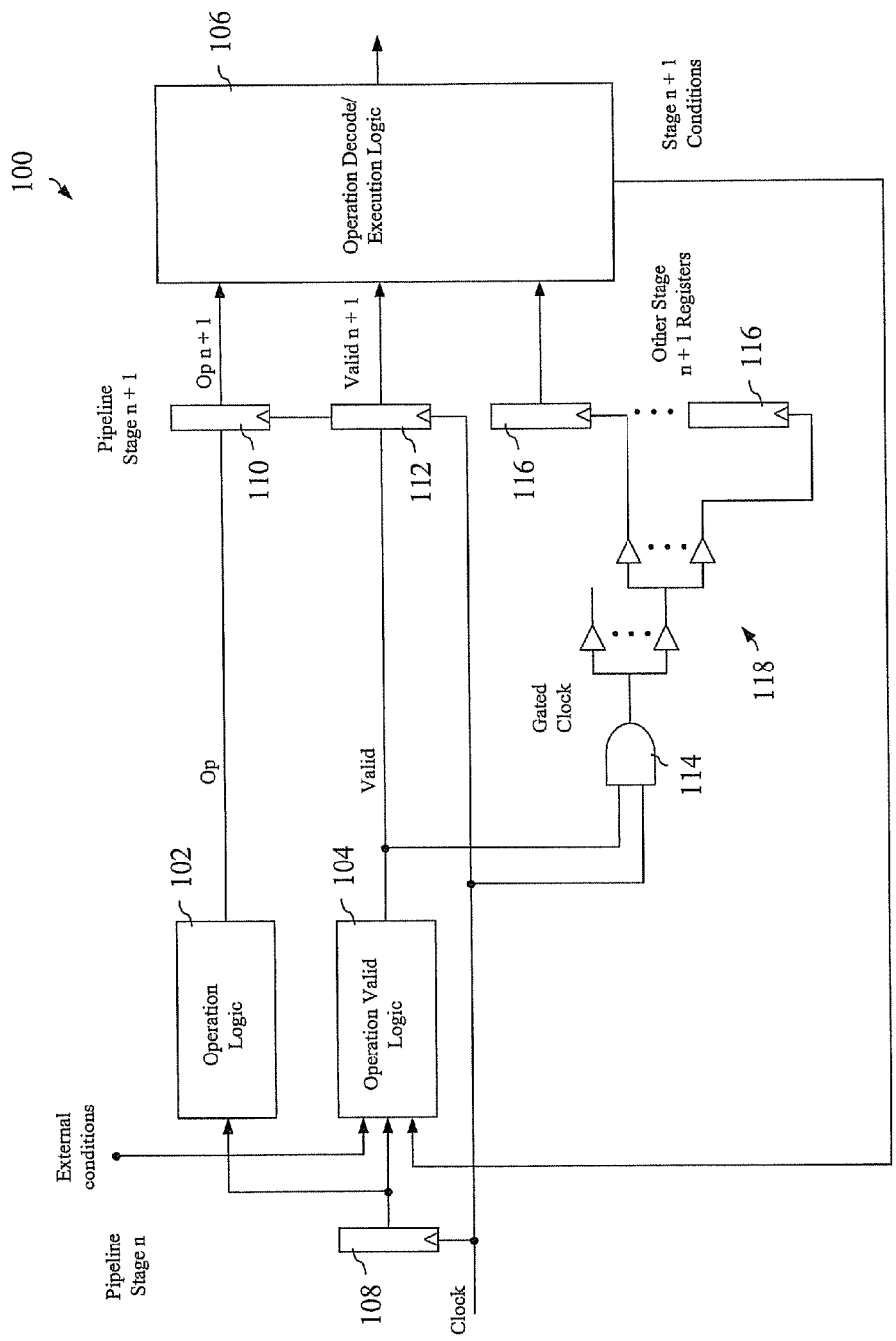
FIG. 1 is a schematic diagram illustrating a conventional precise clock gating scheme for pipelined digital logic circuitry.

Referring initially to FIG. 1, there is shown a schematic diagram of a conventional precise clock gating scheme for pipelined digital logic circuitry 100. In particular, two sequential pipeline stages n and n+1 are depicted. Stage n constructs an operation to be performed by stage n+1 through the circuitry depicted "Operation Logic" 102. In addition, pipeline stage n, through the circuitry depicted "Operation Valid Logic" 104 creates the operation-qualifying control signal "Valid" that, when asserted, instructs stage n+1 to perform the operation "Op" through the Operation Decode/Execution Logic 106.

The clock signal ("Clock") clocks stage n (e.g., register 108) as well as and the Op and Valid registers 110, 112, respectively, in stage n+1. The gated clock signal "Gated Clock" gates "Clock" with AND gate 114 using the "Valid" control signal generated by the Operation Valid Logic 104. The Gated Clock signal clocks a multitude of other stage n+1 registers 116 through a clock tree structure and buffer devices, as generally depicted at 118. These additional registers 116 of stage n+1 need only be clocked when there is a valid operation for stage n+1 to perform and may comprise, for example, operand registers, control registers, register arrays, and the like.

As further shown in FIG. 1, in generating the "Valid" signal, the Operation Valid Logic 104 utilizes inputs from pipeline stage n, feedback conditions from pipeline stage n+1, and "External conditions." Such external conditions originate from external units residing outside of pipeline stages n and n+1 that are relevant to determining when an operation ought to be performed by pipeline stage n+1, and therefore are relevant in determining when the Gated Clock should be pulsed (i.e., Valid=1). The Valid signal generated by Operation Valid Logic 104 is precise in that it is always asserted whenever there is an operation for stage n+1 to perform, but it is never asserted in the event there is no operation to perform.

FIG. 1 itself illustrates the problem with using a precise valid signal to gate a clock: certain conditions that are required to develop a precise valid signal in pipeline stage n may come from inputs from the next pipeline stage n+1 or from external units, both of which may be physically distant from the Operation Valid Logic 104. These signals may arrive so late that by the time they are combined with "local" stage n conditions (which may also be late and which combination requires additional logic stages), the Valid signal is generated too late to gate the clock, thereby limiting the performance of a precise clock gating scheme. The timing requirements on a latch clock gate signal are much tighter than the data input to a latch. In FIG. 1, although there is time to latch the Valid signal in the stage n+1 latch 112, there is not sufficient time to generate Gated Clock and distribute it to the other stage n+1 registers 116 based on the Valid signal.

Figure 2:
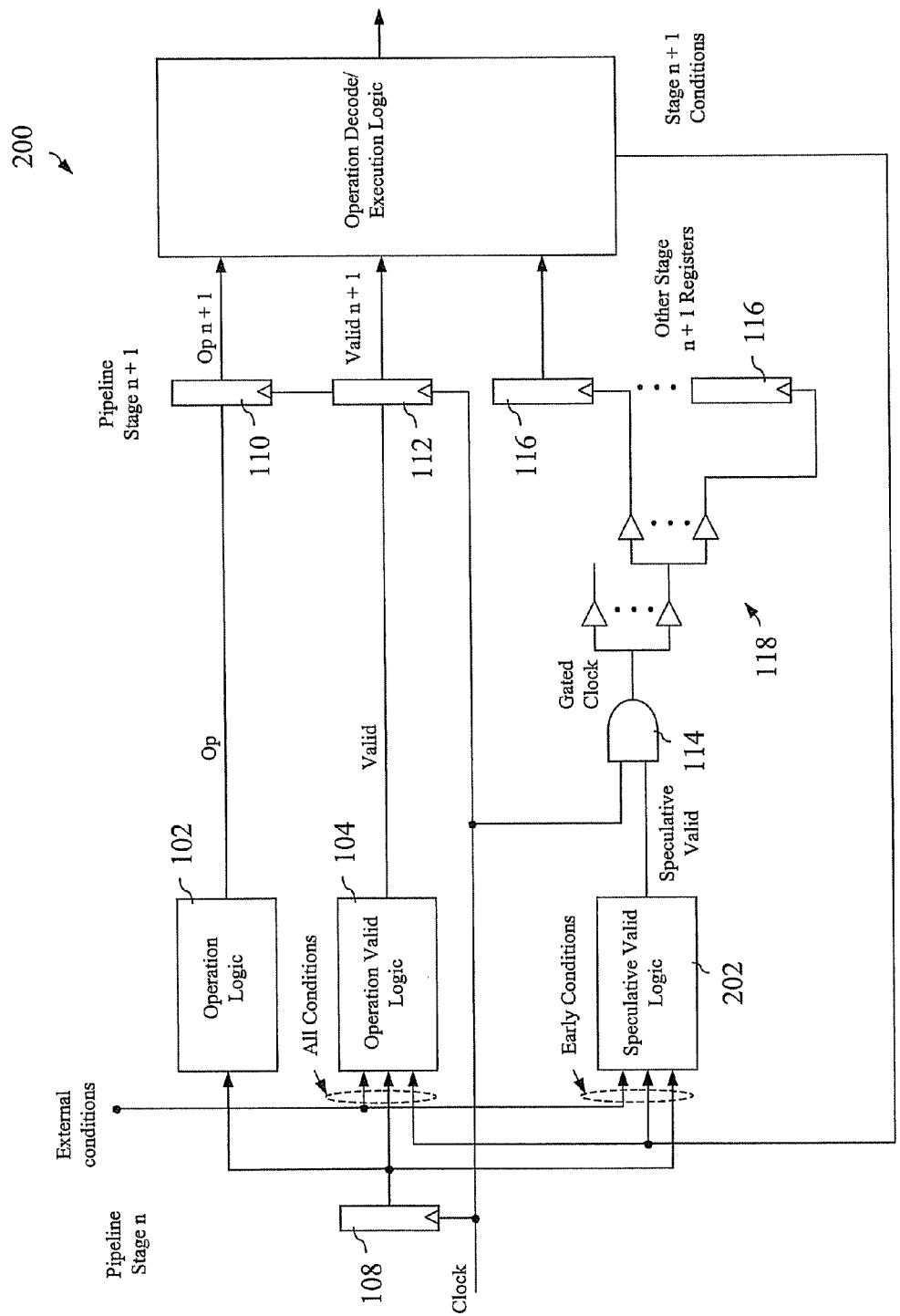
FIG. 2 is a schematic diagram illustrating a speculative clock gating scheme for pipelined digital logic circuitry, in accordance with an embodiment of the invention.

Therefore, in accordance with an embodiment of the invention, FIG. 2 is a schematic diagram illustrating a speculative clock gating scheme for pipelined digital logic circuitry 200. In addition to the devices shown the precise clock gating scheme of FIG. 1, the speculative clock gating scheme of FIG. 2 further includes "Speculative Valid Logic" 202 configured to produce a "Speculative Valid" signal. As opposed to the generation of the "Valid" signal, the generation of the "Speculative Valid" signal does not rely on the use of any late arriving signals. That is, the Speculative Valid Logic 202 uses a subset of the entire set of conditions used by the Operation Valid Logic 104, which subset represents only the early inputs from the set of stage n, external, and stage n+1 inputs. As such, the Speculative Valid signal is imprecise since it is possible for it to be asserted even when Valid is not, again because Speculative Valid is not qualified with all the conditions of Valid.

Consequently, the gated clock may unnecessarily pulse from time to time, consuming power that may have been saved had the gating signal been precise. On the other hand, the present invention embodiment facilitates the development of a gated clock that may have otherwise been infeasible from a performance standpoint due to timing constraints. Moreover, if the late conditions capable of causing the clock to be gated (in precise clock gating) occur relatively infrequently, most of the power savings may still be realized with the presently disclosed speculative clock gating.

One property of the Speculative Valid signal is that it shall never be deasserted when it ought to be asserted; that is, whenever Valid is asserted (Valid=1), then by definition Speculative Valid is also asserted (Speculative Valid=1). On the other hand, Speculative Valid could still be asserted even where Valid is deasserted (i.e., Valid=0, but Speculative Valid=1). This first property ensures that no mandatory clock pulse is omitted, otherwise the corresponding stage n+1 logic operation would fail.

Accordingly, a second property of the Speculative Valid signal is a consequence of the imprecise nature of the Speculative Valid Logic. More clock pulses are enabled by the Speculative Valid signal than by the a precise Valid signal, however this property does not result in logic malfunction because the precise Valid signal is still used by the Valid latch 112 in stage n+1 to qualify the operation received by the OP latch 110 in stage n+1. This guarantees that the n+1 stage performs an operation only when there is a valid operation to perform.

As indicated above, whereas Operation Valid Logic 104 uses the entire set of input conditions, the Speculative Valid Logic 202 uses only the early inputs from this set. An "early" input may be defined as an input signal that is received at or prior to a defined latency time within the total cycle time of the pipeline circuitry. A "late" input may be defined as an input signal that is received after the defined latency time but still within the cycle time of the circuitry. The defined latency time may be based (at least in part) on an amount of time taken for a clock signal to be propagated through a distribution tree to one or more most time-distant latches, such as the other stage n+1 registers in FIG. 2, for example. If a control input signal is received after the defined latency period, and this control input signal is needed to generate a gated clock signal that is to be propagated through a lengthy clock distribution tree, then there will not be sufficient time to propagate this "late" clock signal to remote latches prior to the end of the cycle.

Thus, those inputs that do not arrive by the defined latency time (and thus do not have sufficient time to be propagated through the distribution tree to the most time-distant latches before the end of the cycle time) are not considered "early" inputs but are instead "late inputs." Since the late inputs are not considered by the Speculative Valid Logic, the Speculative Valid signal can be asserted provided all of the early conditions are met. However, since the Operation Valid Logic considers both the early and late conditions, the Valid signal is asserted only if all of the early and late conditions are satisfied.

The concept of "early" versus "late" inputs with respect to generating the Speculative Valid signal may be further understood upon consideration of the total cycle time of a pipeline stage such as shown in FIG. 2. If $t_1$ represents the amount of time needed to propagate the Valid signal to the data input of register 112 with $t_{GD}$ representing the guard time (set up time) for the data input of register 112, and if $t_2$ represents the amount of time needed to propagate the Gated Clock signal through the distribution tree 118 to the most time-distant of the registers 116 with $t_{GC}$ representing the guard time on the clock input for the register(s) 116, then it follows that:

$$t_2 + t_{GC} > t_1 + t_{GD} \quad \text{(Eq. 1)}$$

In terms of the arrival time for an input control signal needed to generate an output signal that has adequate time to propagate to its destination prior to the end of the pipeline cycle time ($C_T$), then the latest arrival time ($A_T$) for an input control signal that can be used to generate the Valid control signal may be expressed as follows:

$$A_T(\text{input to valid}) = C_T - (t_1 + t_{GD} + t_{LOGIC}); \quad \text{(Eq. 2)}$$

where $t_{LOGIC}$ represents propagation time through logic sufficient for the input control signal to qualify the output signal (e.g., Valid, Speculative Valid, as the case may be). On the other hand, latest arrival time ($A_T$) for an input control signal that can be used to generate the Speculative Valid control signal, and hence the Gated Clock may be expressed as follows:

$$A_T(\text{input to speculative valid}) = C_T - (t_2 + t_{GC} + t_{LOGIC}) \quad \text{(Eq. 3)}$$

Therefore, from Eq. 1 above:

$$0 < A_T(\text{input to speculative valid}) < A_T(\text{input to valid}) < C_T; \quad \text{(Eq. 4)}$$

That is, the maximum time allowed for an input control signal to arrive in order to generate an output (Gated Clock) propagated to registers 116 is less than that for the maximum time allowed for an input control signal to arrive in order to generate an output (Valid) propagated to register 112. Accordingly, since the Speculative Valid signal gates the Gated Clock signal sent to registers 116, then the Speculative Valid Logic only considers those inputs that are "early" arriving (i.e., those inputs arriving by a defined latency time based on $A_T$ (input to speculative valid) discussed above). In one exemplary embodiment, the defined latency time may be $A_T$ (input to speculative valid). In this case, control inputs arriving at or before $A_T$ (input to speculative valid) are early inputs used by the Speculative Valid logic 202 in generating the Speculative Valid signal, and those control inputs arriving after $A_T$ (input to speculative valid) are used only by the Operation Valid Logic 104 in generating the Valid signal.

In summary, the above described properties may be applied advantageously as a method for evaluating and constructing a clock gating signal from a fully-qualified logic expression created in a pipeline stage n for issuing an operation to a subsequent pipeline stage. The logic expression is evaluated for terms that meet these properties. The terms are then subset into a speculative logic signal used for clock gating certain registers in the subsequent n+1 stage, while the complete expression is forwarded to a non-clock gated register in the subsequent n+1 stage to precisely qualify an operation.

It should be understood by one skilled in the art that the Operation Valid Logic 104 and Speculative Operation Valid Logic 202 shown in FIG. 2 may be combined into a single functional block structured such that the early conditions are logically combined to create a speculative valid signal that is output to the clock gating logic. The speculative valid signal may then also be further qualified with late conditions in order to create the valid signal.

Figure 3:
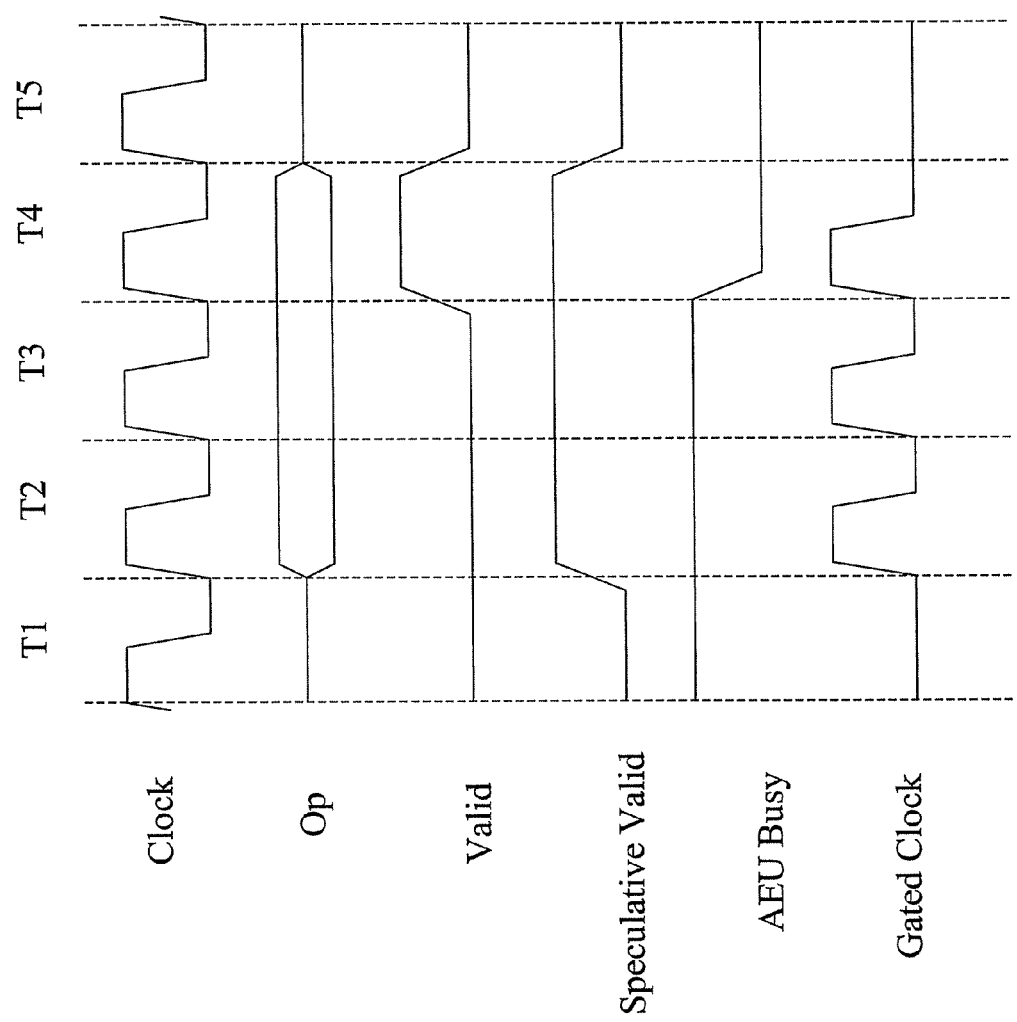
FIG. 3 is a timing diagram illustrating an exemplary operation of a speculative clock gating scheme, such as the scheme shown in FIG. 2.

Referring now to FIG. 3, there is shown a timing diagram illustrating an exemplary operation of a speculative clock gating scheme, such as the scheme shown in FIG. 2. As an illustrative example, pipeline stage n+1 may be an arithmetic execution unit (AEU) and pipeline stage n may be an instruction or operation issue unit that commands the AEU as to what operation to perform and when to perform it. A sufficient and early condition for asserting a speculative valid may be, for example, the presence of a valid instruction (e.g., add, subtract, etc.) in pipeline stage n. A late condition necessary for asserting a precise valid signal (but not necessary for the speculative valid signal) may be the condition that the "arithmetic execution unit is busy," and cannot perform a new operation until the current operation finishes.

Under these conditions, the sequencing of the Valid, Speculative Valid, and Gated Clock signals are as shown in FIG. 3. During the period T1, there is no valid operation (Op) to perform by the AEU. Therefore, neither the Speculative Valid nor the Valid signals are asserted by the issue unit. Consequently, the Clock signal is not passed (i.e., the Gated Clock signal remains low). Then, during the period T2 an add operation arrives in the issue unit. Being an early condition, the Speculative Valid signal is asserted, which results in a Gated Clock pulse in accordance with the above described speculative gating approach. However, it will be further seen in T2 that since the AEU is still busy, the Valid signal remains unasserted. Although some power will be dissipated due to the Gated Clock pulse, the validation of the commanded operation will not take place. This condition remains during period T3, wherein the AEU is still busy. Since Speculative Valid remains asserted, another Gated Clock pulse is passed.

Then, during period T4, the AEU is no longer busy, and the issue unit now asserts both the Valid and Speculative Valid signals while the add operation is still issued to the AEU. Since Gated Clock is pulsed in all of the periods T2, T3, and T4, the other stage n+1 registers 116 in FIG. 2 are clocked in each of these cycles. However, only in period T4 is their contents valid as qualified by the Valid signal. Clock power is used in periods T2 and T3 but no functional error occurs. Finally, in period T5, there is no longer an operation registered in the issued unit, and thus both Valid and Speculative Valid are deasserted. Accordingly, while clock power is used in periods T2 and T3 (as opposed to just T4 for precise clock gating) clock power is still saved in T1 and T5 when there is no operation registered in the issue unit for the AEU to perform.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing speculative clock gating of digital logic circuits included in a multiple stage pipeline design, the method comprising:

generating, in a first pipeline stage n, a valid control signal that is input to a first register in a second pipeline stage n+1, the valid control signal indicative of when an operation is qualified to be performed by the second pipeline stage n+1; and generating, in the first pipeline stage, a speculative valid control signal that is used to gate a clock signal to a plurality of additional registers in the second pipeline stage, wherein the speculative valid control signal is generated using only a subset of a total number of control inputs used in generating the valid control signal, and wherein the clock signal is sent directly, without gating, to the first register in the second pipeline stage wherein the generating is performed using a computer system.

2. The method of claim 1, wherein the speculative valid control signal is always asserted whenever the valid control signal is asserted, and wherein the speculative valid control signal is also capable of being asserted in instances where the valid control signal is not asserted.

3. The method of claim 2, wherein:
the subset of the total number of control inputs used in generating the valid control signal represents early arriving control inputs, and the total number of control inputs represents both early arriving control inputs and late arriving control inputs;
wherein early arriving control inputs comprise control inputs that are received by the first pipeline stage at or before a defined latency time within a total cycle time of the pipeline circuitry, and late arriving control inputs comprise control inputs that are received by the first pipeline after the defined latency time but within the total cycle time of the pipeline circuitry.

4. The method of claim 3, wherein the defined latency time is based at least in part upon an amount of time for the gated clock signal to propagate through a clock distribution tree to the plurality of additional registers in the second pipeline stage.

5. The method of claim 4, wherein the defined latency time, $A_T$ (input to speculative valid), is given by the expression:

$$A_T(\text{input to speculative valid}) = C_T - (t_2 + t_{GC} + t_{LOGIC});$$

wherein $C_T$ is the pipeline cycle time, $t_2$ is the amount of time needed to propagate the gated clock signal through the clock distribution tree to the plurality of additional registers in the second pipeline stage, $t_{GC}$ is a guard time on a clock input for the plurality of additional registers in the second pipeline stage, and $t_{LOGIC}$ is sufficient signal propagation time through the speculative valid logic for the early control inputs to qualify the speculative valid control signal.

6. The method of claim 3, wherein the total number of control inputs used in generating the valid control signal includes inputs received from the first pipeline stage n, feedback conditions from the second pipeline stage n+1, and from external units residing outside of the first and second pipeline stages n and n+1.

7. The method of claim 6, wherein the early arriving control inputs used in generating the speculative valid control signal also include inputs received from the first pipeline stage n, feedback conditions from the second pipeline stage n+1, and from external units residing outside of the first and second pipeline stages n and n+1.

8. The method of claim 1, wherein the clock signal is also sent directly, without gating, to a second register in the second pipeline stage, the second register configured to receive a commanded operation from the first pipeline stage.

9. An apparatus for implementing speculative clock gating of digital logic circuits included in a multiple stage pipeline design, comprising:
operation valid logic configured to generate, in a first pipeline stage n, a valid control signal that is input to a first register in a second pipeline stage n+1, the valid control signal indicative of when an operation is qualified to be performed by the second pipeline stage n+1; and
speculative valid logic configured to generate, in the first pipeline stage, a speculative valid control signal that is used to gate a clock signal to a plurality of additional registers in the second pipeline stage, wherein the speculative valid control signal is generated using only a subset of a total number of control inputs used in generating the valid control signal, and wherein the clock signal is sent directly, without gating, to both the first register in the second pipeline stage.

10. The apparatus of claim 9, wherein the speculative valid control signal is always asserted whenever the valid control signal is asserted, and wherein the speculative valid control signal is also capable of being asserted in instances where the valid control signal is not asserted.

11. The apparatus of claim 10, wherein:
the subset of the total number of control inputs used in generating the valid control signal represents early arriving control inputs, and the total number of control inputs represents both early arriving control inputs and late arriving control inputs;
wherein early arriving control inputs comprise control inputs that are received by the first pipeline stage at or before a defined latency time within a total cycle time of the pipeline circuitry, and late arriving control inputs comprise control inputs that are received by the first pipeline after the defined latency time but within the total cycle time of the pipeline circuitry.

12. The apparatus of claim 11, wherein the defined latency time is based at least in part upon an amount of time for the gated clock signal to propagate through a clock distribution tree to the plurality of additional registers in the second pipeline stage.

13. The apparatus of claim 12, wherein the defined latency time, $A_T$ (input to speculative valid), is given by the expression:

$$A_T(\text{input to speculative valid}) = C_T - (t_2 + t_{GC} + t_{LOGIC});$$

wherein $C_T$ is the pipeline cycle time, $t_2$ is the amount of time needed to propagate the gated clock signal through the clock distribution tree to the plurality of additional registers in the second pipeline stage, $t_{GC}$ is a guard time on a clock input for the plurality of additional registers in the second pipeline stage, and $t_{LOGIC}$ is sufficient signal propagation time through the speculative valid logic for the early control inputs to qualify the speculative valid control signal.

14. The apparatus of claim 11, wherein the total number of control inputs used in generating the valid control signal includes inputs received from the first pipeline stage n, feedback conditions from the second pipeline stage n+1, and from external units residing outside of the first and second pipeline stages n and n+1.

15. The apparatus of claim 14, wherein the early arriving control inputs used in generating the speculative valid control signal also include inputs received from the first pipeline stage n, feedback conditions from the second pipeline stage n+1, and from external units residing outside of the first and second pipeline stages n and n+1.

16. The apparatus of claim 9, further comprising a second register in the second pipeline stage, the second register configured to receive a commanded operation from the first pipeline stage, wherein the clock signal is also sent directly, without gating, to the second register.

17. A computer system, comprising:
a pipeline having first and second pipeline stages;
the first pipeline stage comprising operation valid logic configured to generate a valid control signal for the second pipeline stage, the valid control signal indicative of when an operation is qualified to be performed by the second pipeline stage;

the first pipeline stage further comprising speculative valid logic configured to generate a speculative valid control signal that is used to gate a clock signal sent to the second pipeline stage, wherein the speculative valid control signal is generated using only a subset of a total number of control inputs used in generating the valid control signal;

the second pipeline stage comprising a first register that receives the valid control signal as a data input thereto, and plurality of additional registers receiving the gated clock signal; and wherein the clock signal is sent directly, without gating, to the first register in the second pipeline stage.

18. The computer system of claim 17, wherein the speculative valid control signal is always asserted whenever the valid control signal is asserted, and wherein the speculative valid control signal is also capable of being asserted in instances where the valid control signal is not asserted.

19. The computer system of claim 18, wherein:
the subset of the total number of control inputs used in generating the valid control signal represents early arriving control inputs, and the total number of control inputs represents both early arriving control inputs and late arriving control inputs;
wherein early arriving control inputs comprise control inputs that are received by the first pipeline stage at or before a defined latency time within a total cycle time of the pipeline circuitry, and late arriving control inputs comprise control inputs that are received by the first pipeline after the defined latency time but within the total cycle time of the pipeline circuitry.

20. The computer system of claim 19, wherein the defined latency time is based at least in part upon an amount of time for the gated clock signal to propagate through a clock distribution tree to the plurality of additional registers in the second pipeline stage.

21. The computer system of claim 20, wherein the defined latency time, $A_T$ (input to speculative valid), is given by the expression:

$$A_T(\text{input to speculative valid}) = C_T - (t_2 + t_{GC} + t_{LOGIC});$$

wherein $C_T$ is the pipeline cycle time, $t_2$ is the amount of time needed to propagate the gated clock signal through the clock distribution tree to the plurality of additional registers in the second pipeline stage, $t_{GC}$ is a guard time on a clock input for the plurality of additional registers in the second pipeline stage, and $t_{LOGIC}$ is sufficient signal propagation time through the speculative valid logic for the early control inputs to qualify the speculative valid control signal.

22. The computer system of claim 19, wherein the total number of control inputs used in generating the valid control signal includes inputs received from the first pipeline stage n, feedback conditions from the second pipeline stage n+1, and from external units residing outside of the first and second pipeline stages n and n+1.

23. The computer system of claim 22, wherein the early arriving control inputs used in generating the speculative valid control signal also include inputs received from the first pipeline stage n, feedback conditions from the second pipeline stage n+1, and from external units residing outside of the first and second pipeline stages n and n+1.

24. The computer system of claim 17, further comprising:
operation logic within the first pipeline stage, the operation logic configured to generate an operation to be performed by the second pipeline stage; and
a second register in the second pipeline stage, the second register configured to receive a commanded operation from the first pipeline stage as a data input thereto, wherein the clock signal is also sent directly, without gating, to the second register.

* * * * *